(12) United States Patent
Miller et al.

(10) Patent No.: US 9,813,664 B1
(45) Date of Patent: Nov. 7, 2017

(54) METHOD AND SYSTEM FOR CREATING MEDIA CONTENT

(71) Applicant: DISCOVERY COMMUNICATIONS, LLC, Silver Spring, MD (US)

(72) Inventors: Brinton A. Miller, Washington, DC (US); Robert L. Collins, Annapolis, MD (US); Joshua C. Derby, Damascus, MD (US); Charles J. Myers, Oak Hill, VA (US)

(73) Assignee: Discovery Communications, LLC, Silver Spring, MD (US)

( * ) Notice: Subject to any disclaimer, the term of this patent is extended or adjusted under 35 U.S.C. 154(b) by 199 days.

(21) Appl. No.: 14/092,149

(22) Filed: Nov. 27, 2013

Related U.S. Application Data

(60) Provisional application No. 61/731,402, filed on Nov. 29, 2012.

(51) Int. Cl.
*G06F 17/00* (2006.01)
*H04N 7/08* (2006.01)

(52) U.S. Cl.
CPC .................... *H04N 7/08* (2013.01)

(58) Field of Classification Search
CPC .................... G06F 8/65; H04L 67/02
See application file for complete search history.

(56) References Cited

U.S. PATENT DOCUMENTS

| | | | | |
|---|---|---|---|---|
| 7,389,474 | B2* | 6/2008 | Rettig | G06F 17/2217 704/2 |
| 2006/0143191 | A1* | 6/2006 | Cho | G11B 27/034 |
| 2010/0149091 | A1* | 6/2010 | Kota | G06T 11/00 345/156 |
| 2012/0042050 | A1* | 2/2012 | Chen | H04L 65/607 709/219 |
| 2012/0084345 | A1* | 4/2012 | Silbey | H04L 67/02 709/203 |
| 2013/0111028 | A1* | 5/2013 | Kondrad | H04L 65/1016 709/225 |
| 2013/0272394 | A1* | 10/2013 | Brockmann | G06T 9/00 375/240.12 |

OTHER PUBLICATIONS

Nested Relationships in XML, Visual Studio .Net 2003, http://msdn.microsoft.com/en-us/library/yk41a37k(v=vs.71).aspx, Archive Nov. 1, 2012, 1 page.*

* cited by examiner

*Primary Examiner* — Scott Baderman
*Assistant Examiner* — Barbara Level
(74) *Attorney, Agent, or Firm* — Bookoff McAndrews, PLLC

(57) ABSTRACT

Methods, apparatuses, and computer program products are disclosed for determining a plurality of parameters of a shim file to define a format of at least one media content input, creating a file based program master based on the shim file, and providing the created file based program master to a user for creating and delivering the at least one media content input.

18 Claims, 26 Drawing Sheets

```
<Shim>
    <ShimID>http://www.███████/12345</ShimID>
    <Section name="Main">
        <Group>
            <wrapper>
                <Track name="Video"/>
                <Track name="Audio"/>
            </wrapper>
        </Group>
    </Section>
    <Section name="SupplementalAudio">
        <Group name="MUS">
            <wrapper>
                <Track>
            </wrapper>
        </Group>
        <Group name="NAR">
            <wrapper>
                <Track name="ENG"/>
                <Track name="SPA"/>
            </wrapper>
        </Group>
    </Section>
</Shim>
```

```
<Shim>
    <ShimID>http://www.███████/12345</ShimID>
    <Section name="Main">
        <Group>
            <Wrapper>
                <Track name="Video"/>
                <Track name="Audio"/>
            </Wrapper>
        </Group>
    </Section>
    <Section name="SupplementalAudio">
        <Group name="MUS">
            <Wrapper>
                <Track>
            </Wrapper>
        </Group>
        <Group name="NAR">
            <Wrapper>
                <Track name="ENG"/>
                <Track name="SPA"/>
            </Wrapper>
        </Group>
    </Section>
</Shim>
```

```xml
<?xml version="1.0" encoding="UTF-8"?>
<Shim xmlns="http://www.____.com/shim">
    <ShimID>http://www.____.com/12345</ShimID>
    <ShimName>____ Program Master V0.1</ShimName>
    <AnnotationText>simple worked example</AnnotationText>
    <ApplicationSpec/>
    <Section name="Main">
        <Group>
            <Wrapper>
                <Parameter name="FileFormat">
                    <SubParameter name="FileFormat:Extension" value="MOV"/>
                    <SubParameter name="FileFormat:Writer" value="QuickTime"/>
                    <SubParameter name="FileFormat:SelfContained" value="yes"/>
                </Parameter>
                                         /―202
                <Track kind="Timecode" name="MasterTC">
                    <Parameter name="Timecode">
                        <SubParameter name="Timecode:Start" value="01:00:00;00"/>
                        <SubParameter name="Timecode:DropFrame" value="true"/>
                        <SubParameter name="Timecode:FrameRate" value="30"/>
                    </Parameter>
                </Track>              ―204

<Track kind="Video" name="Video">
                    <Parameter name="SignalStandard">
                        <SubParameter name="SignalStandard:FrameRate" value="30000/1001"/>
                        <SubParameter name="SignalStandard:FrameStructure" value="interlace"/>
                        <SubParameter name="SignalStandard:Horizontal" value="1920"/>
                        <SubParameter name="SignalStandard:Vertical" value="1080"/>
                        <SubParameter name="SignalStandard:AspectRatio" value="16:9"/>
                    </Parameter>

<Parameter name="VideoCodec">
                        <SubParameter name="VideoCodec:Coding" value="VC-3"/>
                        <SubParameter name="VideoCodec:Vendor" value="____"/>
                        <SubParameter name="VideoCodec:Version">
                            <Limit relation="greater_equal" value="2.34"/>
                        </SubParameter>
                        <SubParameter name="VideoCodec:ResolutionID" value="1242"/>
                        <SubParameter name="VideoCodec:ResolutionName" value="DNXHD 145"/>
                        <SubParameter name="VideoCodec:BitRate" value="145000000"/>
                    </Parameter>
                </Track>

<ParameterSet name="PCM_mono_48_20">
                    <Parameter name="AudioCodec">
                        <SubParameter name="AudioCodec:Coding" value="PCM"/>
                    </Parameter>
                    <Parameter name="AudioSampling">
                        <SubParameter name="AudioSampling:Channels" value="1"/>
                        <SubParameter name="AudioSampling:BitsPerSample" value="20"/>
                        <SubParameter name="AudioSampling:SamplingRate" value="48000"/>
                    </Parameter>
                </ParameterSet>
                                                        ―206
                <Track kind="Audio" name="A1" index="1">
                    <Using name="PCM_mono_48_20"/>
                    <Parameter name="TrackLabel">
                        <SubParameter name="TrackLabel:Symbol" value="Left"/>
                        <SubParameter name="TrackLabel:Name" value="Full Mix 5.1 Left"/>
                    </Parameter>
                </Track>              ―208

<Track kind="Audio" name="A2" index="2">
                    <Using name="PCM_mono_48_20"/>
                    <Parameter name="TrackLabel">
                        <SubParameter name="TrackLabel:Symbol" value="Right"/>
                        <SubParameter name="TrackLabel:Name" value="Full Mix 5.1 Right"/>
                    </Parameter>
                </Track>

</Wrapper>
        </Group>
    </Section>
</Shim>
```

FIG. 2

| Shim parameter | Definition |
|---|---|
| Example | Semantic definition of the example shim parameter |
| | Where it may occur, for example: /Section/Group, and cardinality |
| | Attributes |
| | value-ranges |

FIG. 3

| Parameter | Definition |
|---|---|
| FileFormat | The file format used to wrap the program |
| | Occurs once, in Section(Main) /Group/Wrapper. |
| | No extra Attributes |

FIG. 4

| Sub parameter | Definition |
|---|---|
| Extension | The format-specific extension of the file name |
| | Required |
| | Alphanumeric, case not significant, no initial . |
| Writer | The name of the package that creates the files |
| | Required |
| | Alphanumeric, no whitespace, no punctuation |
| SelfContained | True if all essence is contained within the single file, with no need to look elsewhere |
| | Required |
| | Boolean (yes/no or true/false or 1/0) |

FIG. 5

| Parameter | Definition |
|---|---|
| Timecode | Description of the timecode data in the timecode track |
| | Occurs once, in Section(Main)/Group/Wrapper/Track(MasterTC). |
| | No extra Attributes |
| Sub parameter | Definition |
| Start | The starting timecode of the timecode track |
| | Required |
| | Alphanumeric,, SMPTE timecode colon format, Semicolon for DropFrame preferred but not required |
| FrameRate | Integer count of frames per second |
| | Required |
| | Integer, limited to 24 25 30 48 50 60. Note that the factor of 1000/1001 is determined by the precise sample rate of the essence (nearly always 1000/1001 applies to 30; may apply to 24 and others) |
| DropFrame | True if the frame-counting method of the timecode drops frames 0 and 1 at the start 9 out of 10 minutes |
| | Conditional: required if FrameRate=30 or 60 |
| | Boolean (yes/no or true/false or 1/0) |

FIG. 6

| Parameter | Definition |
|---|---|
| SignalStandard | Description of the signal format of the video in the baseband domain |
| | Occurs once for each Video track, in Section(Main)/Group/Wrapper/Track(Video). |
| | No extra Attributes |
| Sub parameter | Definition |
| FrameRate | Exact count of frames per second |
| | Required |
| | Rational expressed as numerator/denominator. Denominator 1 may be omitted. |
| | Examples: 25 30000/1001 |
| FrameStructure | The name of the frame structure, for example progressive or interlace |
| | Required |
| | Controlled vocabulary, may be: |
| | progressive interlace segmented |
| Horizontal | Integer count of samples in active video |
| | Required |
| | Integer |
| | Example: 1920 |
| Vertical | Integer count of lines in active video or a complete frame |
| | Required |
| | Integer |
| | Example: 1080 |
| AspectRatio | Ratio of horizontal to vertical for the signal raster |
| | Note that an Active Format Description may be provided elsewhere |
| | Required |
| | Rational expressed as numerator:denominator or numerator/denominator. |
| | Examples: 16:9 4/3 |

FIG. 7

| Parameter | Definition |
|---|---|
| VideoCodec | Description of the codec used to process and compress the video into the essence format |
| | Occurs once for each Video track, in Section(Main)/Group/Wrapper/Track(Video). |
| | No extra Attributes |

| Sub parameter | Definition |
|---|---|
| Coding | Name of the compression family |
| | Required |
| | Controlled vocabulary. Use SMPTE names where possible |
| | Examples: VC-3 MPEG-2 H.264 VC-1 |
| Vendor | Name of the vendor of the specific codec used |
| | Required |
| | String. Whitespace requires quotes if more than one alternative is to be specified |
| | |
| Version | Version of the specific codec used |
| | Optional |
| | String. |
| | If the string can be parsed as a fixed point number, ordinal relations can be used in any Limits |
| | Examples: 2.34 |
| ResolutionID | A specific enumerated identifier for the compression variant, if one exists in the standards documentation |
| | Optional |
| | String |
| | If the string can be parsed as a fixed point number, ordinal relations can be used in any Limits |
| | Examples: 1235 |
| ResolutionName | A string name for the compression variant, per the vendor documentation |
| | Required |
| | String. Whitespace requires quotes if more than one alternative is to be specified |
| | Example "DNxHD 145" |
| BitRate | A numeric measure of the target bit rate of the compressed signal, per the vendor documentation |
| | Required |
| | HumanNumeric. An integer of fixed-point number, optional suffixes for k M G are permitted |
| | Examples: 145000000 or 145M |

FIG. 8

| Parameter | Definition |
|---|---|
| TrackLabel | Description of the track label that is to be used in the Wrapper |
| | Occurs once for each channel in each Audio track, in Section(Main)/Group/Wrapper/Track(Audio). |
| | No extra Attributes |
| Sub parameter | Definition |
| Symbol | A symbolic name for the Track, per Discovery standards |
| | Optional |
| | String |
| | Example: Left |
| Name | A name string for the Track |
| | Optional |
| | String |
| | Example: Full Mix 5.1 Left |
| Language | A symbolic name for the Track, per ISO 639-2 |
| | Optional |
| | String |
| | Example: ENG |

FIG. 9

| Parameter | Definition |
|---|---|
| AudioCodec | Description of the codec used to process and compress the audio into the essence format |
| | Occurs once for each Audio track, in Section(Main)/Group/Wrapper/Track(Audio). |
| | No extra Attributes |
| Sub parameter | Definition |
| Coding | Name of the compression family |
| | Required |
| | Controlled vocabulary. Use SMPTE names where possible |
| | Examples: PCM AC/3 |
| Vendor | Name of the vendor of the specific codec used |
| | Conditional: not needed if Coding is PCM |
| | String. Whitespace requires quotes if more than one alternative is to be specified |
| Version | Version of the specific codec used |
| | Optional |
| | String. If the string can be parsed as a fixed point number, ordinal relations can be used in any Limits |
| ResolutionID | A specific enumerated identifier for the compression variant, if one exists in the standards documentation |
| | Optional |
| | String. If the string can be parsed as a fixed point number, ordinal relations can be used in any Limits |
| ResolutionName | A string name for the compression variant, per the vendor documentation |
| | Conditional: not needed if Coding is PCM |
| | String. Whitespace requires quotes if more than one alternative is to be specified |
| BitRate | A numeric measure of the target bit rate of the compressed signal, per the vendor documentation |
| | Optional |
| | HumanNumeric. An integer of fixed-point number, optional suffixes for k M G are permitted |

FIG. 10

| Parameter | Definition |
|---|---|
| AudioSampling | Description of the signal format of the audio in the baseband domain |
| | Occurs once for each Audio track, in Section(Main)/Group/Wrapper/Track(Audio). |
| | No extra Attributes |
| Sub parameter | Definition |
| Channels | Count of channels in each Audio Track |
| | Required |
| | Integer. |
| | Example: 1 |
| BitsPerSample | The number of bits in the PCM sampling of audio per channel |
| | Required |
| | Integer |
| | Example: 20 |
| SamplingRate | The exact number of samples per second per channel |
| | Required |
| | Rational expressed as numerator/denominator. Denominator 1 may be omitted. |
| | Examples: 48000 |

FIG. 11

```
<?xml version="1.0" encoding="UTF-8"?>
<!--Copyright © Discovery Communications Inc.-->
<xs:schema xmlns:xs=http://www.w3.org/2001/XMLSchema
           xmlns="http://www.discovery.com/shim/proto/20120924"
           targetNamespace="http://www.discovery.com/shim/proto/20120924"
           elementFormDefault="qualified" attributeFormDefault="unqualified">
    <xs:element name="Shim" type="ShimType">
        <xs:annotation>
            <xs:documentation>A machine readable shim for users to describe deliverable content
            </xs:documentation>
        </xs:annotation>
    </xs:element>
    <xs:complexType name="ShimType">
        <xs:annotation>
            <xs:documentation>Basic elements include identifiers and annotations</xs:documentation>
        </xs:annotation>
        <xs:sequence>
            <xs:element name="ShimName" type="xs:string"/>
            <xs:element name="ShimID" type="xs:anyURI" minOccurs="0"/>
            <xs:element name="AnnotationText" type="xs:string" minOccurs="0" maxOccurs="unbounded"/>
            <xs:element name="ApplicationSpec" type="xs:string" minOccurs="0"/>
            <xs:element ref="Section" minOccurs="0" maxOccurs="unbounded"/>
        </xs:sequence>
        <xs:anyAttribute namespace="##other" processContents="lax"/>
    </xs:complexType>
    <xs:element name="Section" type="SectionType">
        <xs:annotation>
            <xs:documentation> Each Section describes a major division of the content, such as Main,
                              Audio, Graphics, Metadata
            </xs:documentation>
        </xs:annotation>
    </xs:element>
    <xs:complexType name="SectionType">
        <xs:sequence>
            <xs:element ref="Group" minOccurs="0" maxOccurs="unbounded"/>
        </xs:sequence>
        <xs:attribute name="name"/>
    </xs:complexType>
```

FIG. 20

```
<xs:element name="Group" type="GroupType">
    <xs:annotation>
        <xs:documentation> Each Group describes a part of a Section. For example, within Graphics
                        there may be Groups for Open, Credits, LowerThirds
        </xs:documentation>
    </xs:annotation>
</xs:element>
<xs:complexType name="GroupType">
    <xs:sequence minOccurs="0" maxOccurs="unbounded">
        <xs:choice>
            <xs:element ref="Parameter"/>
            <xs:element ref="Using"/>
            <xs:element ref="ParameterSet"/>
            <xs:element ref="Wrapper" minOccurs="0" maxOccurs="unbounded"/>
        </xs:choice>
    </xs:sequence>
    <xs:attribute name="name"/>
</xs:complexType>
<xs:element name="Wrapper" type="WrapperType">
    <xs:annotation>
        <xs:documentation> Within a Group may be one or more Wrapper elements that describe the
                        wrapper in which the essence and metadata Tracks are contained
        </xs:documentation>
    </xs:annotation>
</xs:element>
<xs:complexType name="WrapperType">
    <xs:sequence minOccurs="0" maxOccurs="unbounded">
        <xs:choice>
            <xs:element ref="Parameter"/>
            <xs:element ref="Using"/>
            <xs:element ref="ParameterSet"/>
            <xs:element ref="Track"/>
        </xs:choice>
    </xs:sequence>
    <xs:attribute name="name"/>
</xs:complexType>
<xs:element name="Track" type="TrackType">
    <xs:annotation>
        <xs:documentation> Track describes a particular usage of Essence within a Group.
        </xs:documentation>
    </xs:annotation>
</xs:element>
<xs:complexType name="TrackType">
    <xs:sequence minOccurs="0" maxOccurs="unbounded">
        <xs:choice>
            <xs:element ref="Parameter"/>
            <xs:element ref="Using"/>
            <xs:element ref="ParameterSet"/>
        </xs:choice>
    </xs:sequence>
    <xs:attribute name="kind" type="KindType"/>
    <xs:attribute name="name" type="xs:NCName"/>
    <xs:attribute name="index" type="xs:positiveInteger"/>
</xs:complexType>
<xs:element name="Parameter" type="ParameterType">
    <xs:annotation>
        <xs:documentation> Each Parameter describes a named aspect of a Track (or perhaps a Group
                        or Section) and specifies a required value
        </xs:documentation>
    </xs:annotation>
</xs:element>
<xs:complexType name="ParameterType">
    <xs:sequence minOccurs="0" maxOccurs="unbounded">
        <xs:element name="SubParameter" type="SubParameterType"/>
    </xs:sequence>
    <xs:attribute name="name" type="ParameterNameType"/>
    <xs:attribute name="index" type="xs:positiveInteger"/>
</xs:complexType>
<xs:element name="SubParameter" type="SubParameterType">
    <xs:annotation>
        <xs:documentation> Within Parameters, SubParameters may be specified. For example, a Codec
                        parameter may require a Version subparameter
        </xs:documentation>
    </xs:annotation>
</xs:element>
<xs:complexType name="SubParameterType">
    <xs:sequence>
        <xs:element ref="Limit" minOccurs="0" maxOccurs="unbounded"/>
    </xs:sequence>
    <xs:attribute name="name" type="SubParameterNameType"/>
    <xs:attribute name="index" type="xs:positiveInteger"/>
    <xs:attribute name="type"/>
```

FIG. 21

```xml
        <xs:attribute name="value"/>
</xs:complexType>
<xs:element name="Limit" type="LimitType">
    <xs:annotation>
        <xs:documentation> In cases where a parameter does not have a single precise allowed value,
                        Limits may be given in a nested element (or elements). Limits may specify
                        a range of values, or a set of enumerated values
        </xs:documentation>
    </xs:annotation>
</xs:element>
<xs:complexType name="LimitType">
    <xs:attribute name="relation" type="RelationType"/>
    <xs:attribute name="value"/>
    <xs:attribute name="vocabulary" type="xs:anyURI"/>
</xs:complexType>
<xs:element name="ParameterSet" type="ParameterSetType">
    <xs:annotation>
        <xs:documentation> Each ParameterSet describes a collection of Parameters with SubParameters
                        or Limits and their corresponding values that may be applied to a Track
                        (or perhaps a Group or Section) and specifies a required value
        </xs:documentation>
    </xs:annotation>
</xs:element>
<xs:complexType name="ParameterSetType">
    <xs:sequence>
        <xs:element ref="Parameter" minOccurs="0" maxOccurs="unbounded"/>
    </xs:sequence>
    <xs:attribute name="name"/>
</xs:complexType>
<xs:element name="Using" type="ParameterUseType">
    <xs:annotation>
        <xs:documentation> This element indicates a use of a ParameterSet. It may appear wherever a
                        Parameter can be specified. The values of any Parameters or SubParameters
                        obtained from the ParameterSet may be overridden by specifying additional
                        Parameter elements
        </xs:documentation>
    </xs:annotation>
</xs:element>
<xs:complexType name="ParameterUseType">
    <xs:sequence>
        <xs:element ref="Parameter" minOccurs="0" maxOccurs="unbounded"/>
    </xs:sequence>
    <xs:attribute name="name"/>
</xs:complexType>
<xs:simpleType name="KindType">
    <xs:annotation>
        <xs:documentation>KindType enumerates the allowed Track Kinds</xs:documentation>
    </xs:annotation>
    <xs:restriction base="xs:string">
        <xs:enumeration value="Timecode"/>
        <xs:enumeration value="Video"/>
        <xs:enumeration value="Audio"/>
        <xs:enumeration value="Data"/>
    </xs:restriction>
</xs:simpleType>
<xs:simpleType name="RelationType">
    <xs:annotation>
        <xs:documentation> RelationType enumerates the allowed relations within Limits
        </xs:documentation>
    </xs:annotation>
    <xs:restriction base="xs:string">
        <xs:enumeration value="equal"/>
        <xs:enumeration value="less"/>
        <xs:enumeration value="less_equal"/>
        <xs:enumeration value="greater"/>
        <xs:enumeration value="greater_equal"/>
        <xs:enumeration value="not_equal"/>
        <xs:enumeration value="one_of"/>
    </xs:restriction>
</xs:simpleType>
<xs:simpleType name="ParameterNameType">
    <xs:annotation>
        <xs:documentation> Users should add parameter names as new public Parameters are defined
        </xs:documentation>
    </xs:annotation>
    <xs:restriction base="xs:string">
        <xs:enumeration value="FileFormat"/>
        <xs:enumeration value="Timecode"/>
        <xs:enumeration value="SignalStandard"/>
        <xs:enumeration value="VideoCodec"/>
        <xs:enumeration value="AudioCodec"/>
        <xs:enumeration value="AudioSampling"/>
```

FIG. 22

```xml
        <xs:enumeration value="TrackLabel"/>
    </xs:restriction>
</xs:simpleType>
<xs:simpleType name="SubParameterNameType">
    <xs:annotation>
        <xs:documentation> Users should add sub parameter names as new public Parameters are
                            defined. Note that subparameter names always start with the parent
                            parameter name
        </xs:documentation>
    </xs:annotation>
    <xs:restriction base="xs:string">
        <xs:enumeration value="FileFormat:Extension"/>
        <xs:enumeration value="FileFormat:Writer"/>
        <xs:enumeration value="FileFormat:SelfContained"/>
        <xs:enumeration value="FileFormat:Schema"/>
        <xs:enumeration value="Timecode:Start"/>
        <xs:enumeration value="Timecode:DropFrame"/>
        <xs:enumeration value="Timecode:FrameRate"/>
        <xs:enumeration value="SignalStandard:FrameRate"/>
        <xs:enumeration value="SignalStandard:FrameStructure"/>
        <xs:enumeration value="SignalStandard:Horizontal"/>
        <xs:enumeration value="SignalStandard:Vertical"/>
        <xs:enumeration value="SignalStandard:AspectRatio"/>
        <xs:enumeration value="VideoCodec:Coding"/>
        <xs:enumeration value="VideoCodec:Vendor"/>
        <xs:enumeration value="VideoCodec:Version"/>
        <xs:enumeration value="VideoCodec:ResolutionID"/>
        <xs:enumeration value="VideoCodec:ResolutionName"/>
        <xs:enumeration value="VideoCodec:BitRate"/>
        <xs:enumeration value="AudioSampling:Channels"/>
        <xs:enumeration value="AudioSampling:BitsPerSample"/>
        <xs:enumeration value="AudioSampling:SamplingRate"/>
        <xs:enumeration value="AudioCodec:Coding"/>
        <xs:enumeration value="TrackLabel:Symbol"/>
        <xs:enumeration value="TrackLabel:Name"/>
        <xs:enumeration value="TrackLabel:Language"/>
    </xs:restriction>
</xs:simpleType>
</xs:schema>
```

FIG. 23

```xml
<?xml version="1.0" encoding="UTF-8"?>
<!--Copyright © Discovery Communications Inc.-->
<Shim xmlns:xsi="http://www.w3.org/2001/XMLSchema-instance"
      xmlns="http://www.discovery.com/shim/proto/20120924"
      xsi:schemaLocation="http://www.discovery.com/shim/proto/20120919 discovery.shim.20120924.xsd">
    <ShimName>Discovery Program Master V0.1</ShimName>
    <ShimID>http://www.discovery.com/12345</ShimID>
    <AnnotationText>simple worked example</AnnotationText>
    <ApplicationSpec/>
    <Section name="Main">
        <Group>
            <Wrapper>
                <Parameter name="FileFormat">
                    <SubParameter name="FileFormat:Extension" value="MOV"/>
                    <SubParameter name="FileFormat:Writer" value="QuickTime"/>
                    <SubParameter name="FileFormat:SelfContained" value="yes"/>
                </Parameter>

<Track kind="Timecode" name="MasterTC">
                    <Parameter name="Timecode">
                        <SubParameter name="Timecode:Start" value="01:00:00;00"/>
                        <SubParameter name="Timecode:DropFrame" value="true"/>
                        <SubParameter name="Timecode:FrameRate" value="30"/>
                    </Parameter>
                </Track>

<Track kind="Video" name="Video">
                    <Parameter name="SignalStandard">
                        <SubParameter name="SignalStandard:FrameRate" value="30000/1001"/>
                        <SubParameter name="SignalStandard:FrameStructure" value="interlace"/>
                        <SubParameter name="SignalStandard:Horizontal" value="1920"/>
                        <SubParameter name="SignalStandard:Vertical" value="1080"/>
                        <SubParameter name="SignalStandard:AspectRatio" value="16:9"/>
```

FIG. 24

```xml
        </Parameter>

<Parameter name="VideoCodec">
            <SubParameter name="VideoCodec:Coding" value="VC-3"/>
            <SubParameter name="VideoCodec:Vendor" value="AvidTechnology"/>
            <SubParameter name="VideoCodec:Version">
                <Limit relation="greater_equal" value="2.34"/>
            </SubParameter>
            <SubParameter name="VideoCodec:ResolutionID" value="1242"/>
            <SubParameter name="VideoCodec:ResolutionName" value="DNxHD 145"/>
            <SubParameter name="VideoCodec:BitRate" value="145000000"/>
        </Parameter>
    </Track>

<ParameterSet name="PCM_mono_48_20">
        <Parameter name="AudioCodec">
            <SubParameter name="AudioCodec:Coding" value="PCM"/>
        </Parameter>
        <Parameter name="AudioSampling">
            <SubParameter name="AudioSampling:Channels" value="1"/>
            <SubParameter name="AudioSampling:BitsPerSample" value="20"/>
            <SubParameter name="AudioSampling:SamplingRate" value="48000"/>
        </Parameter>
    </ParameterSet>

<Track kind="Audio" name="A1" index="1">
        <Using name="PCM_mono_48_20"/>
        <Parameter name="TrackLabel">
            <SubParameter name="TrackLabel:Symbol"  value="Left"/>
            <SubParameter name="TrackLabel:Name"   value="Full Mix 5.1 Left"/>
        </Parameter>
    </Track>

<Track kind="Audio" name="A2" index="2">
        <Using name="PCM_mono_48_20"/>
        <Parameter name="TrackLabel">
            <SubParameter name="TrackLabel:Symbol"  value="Right"/>
            <SubParameter name="TrackLabel:Name"   value="Full Mix 5.1 Right"/>
        </Parameter>
    </Track>

<Track kind="Audio" name="A3" index="3">
        <Using name="PCM_mono_48_20"/>
        <Parameter name="TrackLabel">
            <SubParameter name="TrackLabel:Symbol"  value="Center"/>
            <SubParameter name="TrackLabel:Name"   value="Full Mix 5.1 Center"/>
        </Parameter>
    </Track>

<Track kind="Audio" name="A4" index="4">
        <Using name="PCM_mono_48_20"/>
        <Parameter name="TrackLabel">
            <SubParameter name="TrackLabel:Symbol"  value="LFE"/>
            <SubParameter name="TrackLabel:Name"   value="Full Mix 5.1 LFE"/>
        </Parameter>
    </Track>

<Track kind="Audio" name="A5" index="5">
        <Using name="PCM_mono_48_20"/>
        <Parameter name="TrackLabel">
            <SubParameter name="TrackLabel:Symbol"  value="LS"/>
            <SubParameter name="TrackLabel:Name"   value="Full Mix 5.1 Left Surround"/>
        </Parameter>
    </Track>

<Track kind="Audio" name="A6" index="6">
        <Using name="PCM_mono_48_20"/>
        <Parameter name="TrackLabel">
            <SubParameter name="TrackLabel:Symbol"  value="RS"/>
            <SubParameter name="TrackLabel:Name"   value="Full Mix 5.1 Right Surround"/>
        </Parameter>
    </Track>

<Track kind="Audio" name="A7" index="7">
        <Using name="PCM_mono_48_20"/>
        <Parameter name="TrackLabel">
            <SubParameter name="TrackLabel:Name"   value="Full Mix Stereo Left"/>
        </Parameter>
    </Track>

<Track kind="Audio" name="A8" index="8">
        <Using name="PCM_mono_48_20"/>
```

FIG. 25

```xml
            <Parameter name="TrackLabel">
                <SubParameter name="TrackLabel:Name"  value="Full Mix Stereo Right"/>
            </Parameter>
        </Track>

<Track kind="Audio" name="A9" index="9">
            <Using name="PCM_mono_48_20"/>
            <Parameter name="TrackLabel">
                <SubParameter name="TrackLabel:Name"  value="Mix Minus Narration Stereo Left"/>
            </Parameter>
        </Track>

<Track kind="Audio" name="A10" index="10">
            <Using name="PCM_mono_48_20"/>
            <Parameter name="TrackLabel">
                <SubParameter name="TrackLabel:Name"  value="Mix Minus Narration Stereo Right"/>
            </Parameter>
        </Track>

<Track kind="Audio" name="A11" index="11">
            <Using name="PCM_mono_48_20"/>
            <Parameter name="TrackLabel">
                <SubParameter name="TrackLabel:Name"  value="Music and Effects Stereo Left"/>
            </Parameter>
        </Track>

<Track kind="Audio" name="A12" index="12">
            <Using name="PCM_mono_48_20"/>
            <Parameter name="TrackLabel">
                <SubParameter name="TrackLabel:Name"  value="Music and Effects Stereo Right"/>
            </Parameter>
        </Track>

<Track kind="Audio" name="A13" index="13">
            <Using name="PCM_mono_48_20"/>
            <Parameter name="TrackLabel">
                <SubParameter name="TrackLabel:Name"  value="Narration Mono"/>
            </Parameter>
        </Track>

<Track kind="Audio" name="A14" index="14">
            <Using name="PCM_mono_48_20"/>
            <Parameter name="TrackLabel">
                <SubParameter name="TrackLabel:Name"
                            value="Interview and foreground dialog Mono"/>
            </Parameter>
        </Track>

<Track kind="Audio" name="A15" index="15">
            <Using name="PCM_mono_48_20"/>
            <Parameter name="TrackLabel">
                <SubParameter name="TrackLabel:Name"
                            value="Sound Effects/SOT/BG dialog Stereo Left"/>
            </Parameter>
        </Track>

<Track kind="Audio" name="A16" index="16">
            <Using name="PCM_mono_48_20"/>
            <Parameter name="TrackLabel">
                <SubParameter name="TrackLabel:Name"
                            value="Sound Effects/SOT/BG dialog Stereo Right"/>
            </Parameter>
        </Track>
      </Wrapper>
    </Group>
  </Section>
</Shim>
```

FIG. 26

```xml
<?xml version="1.0" encoding="UTF-8" ?>
<!-- ████████████████████████████████ -->
<Shim xmlns:xsi="http://█████████████XMLSchema-instance"
    xmlns="http://www.████████/shim/proto/20120924"
    xsi:schemaLocation="http://www.████████/shim/proto/20120924
    ████████.20120924.xsd">
    <ShimName>████████ Program Master V0.1</ShimName>
    <ShimID>http://www.████████/12345</ShimID>
    <AnnotationText>simple worked example</AnnotationText>
    <ApplicationSpec />
    <Section name="Main">
      <Group>
        <Wrapper>
          <Parameter name="FileFormat">
            <SubParameter name="FileFormat:Extension" value="MOV" />
            <SubParameter name="FileFormat:Writer" value="QuickTime" />
            <SubParameter name="FileFormat:SelfContained" value="yes" />
          </Parameter>
          <Track kind="Timecode" name="MasterTC">
            <Parameter name="Timecode">
              <SubParameter name="Timecode:Start" value="01:00:00;00" />
              <SubParameter name="Timecode:DropFrame" value="true" />
              <SubParameter name="Timecode:FrameRate" value="30" />
            </Parameter>
          </Track>
          <Track kind="Video" name="Video">
            <Parameter name="SignalStandard">
              <SubParameter name="SignalStandard:FrameRate"
                value="30000/1001" />
              <SubParameter name="SignalStandard:FrameStructure"
                value="interlace" />
              <SubParameter name="SignalStandard:Horizontal"
                value="1920" />
              <SubParameter name="SignalStandard:Vertical"
                value="1080" />
              <SubParameter name="SignalStandard:AspectRatio"
                value="16:9" />
            </Parameter>
            <Parameter name="VideoCodec">
              <SubParameter name="VideoCodec:Coding" value="VC-3" />
              <SubParameter name="VideoCodec:Vendor"
                value="AvidTechnology" />
              <SubParameter name="VideoCodec:Version">
                <Limit relation="greater_equal" value="2.34" />
              </SubParameter>
              <SubParameter name="VideoCodec:ResolutionID"
                value="1242" />
              <SubParameter name="VideoCodec:ResolutionName"
                value="DNxHD 145" />
              <SubParameter name="VideoCodec:BitRate"
                value="145000000" />
            </Parameter>
          </Track>
```

FIG. 28

```
- <ParameterSet name="PCM_mono_48_20">
  - <Parameter name="AudioCodec">
      <SubParameter name="AudioCodec:Coding" value="PCM" />
    </Parameter>
  - <Parameter name="AudioSampling">
      <SubParameter name="AudioSampling:Channels" value="1" />
      <SubParameter name="AudioSampling:BitsPerSample"
        value="20" />
      <SubParameter name="AudioSampling:SamplingRate"
        value="48000" />
    </Parameter>
  </ParameterSet>
- <Track kind="Audio" name="A1" index="1">
    <Using name="PCM_mono_48_20" />
  - <Parameter name="TrackLabel">
      <SubParameter name="TrackLabel:Symbol" value="Left" />
      <SubParameter name="TrackLabel:Name" value="Full Mix 5.1
        Left" />
    </Parameter>
  </Track>
- <Track kind="Audio" name="A2" index="2">
    <Using name="PCM_mono_48_20" />
  - <Parameter name="TrackLabel">
      <SubParameter name="TrackLabel:Symbol" value="Right" />
      <SubParameter name="TrackLabel:Name" value="Full Mix 5.1
        Right" />
    </Parameter>
  </Track>
- <Track kind="Audio" name="A3" index="3">
    <Using name="PCM_mono_48_20" />
  - <Parameter name="TrackLabel">
      <SubParameter name="TrackLabel:Symbol" value="Center" />
      <SubParameter name="TrackLabel:Name" value="Full Mix 5.1
        Center" />
    </Parameter>
  </Track>
- <Track kind="Audio" name="A4" index="4">
    <Using name="PCM_mono_48_20" />
  - <Parameter name="TrackLabel">
      <SubParameter name="TrackLabel:Symbol" value="LFE" />
      <SubParameter name="TrackLabel:Name" value="Full Mix 5.1
        LFE" />
    </Parameter>
  </Track>
- <Track kind="Audio" name="A5" index="5">
    <Using name="PCM_mono_48_20" />
  - <Parameter name="TrackLabel">
      <SubParameter name="TrackLabel:Symbol" value="LS" />
      <SubParameter name="TrackLabel:Name" value="Full Mix 5.1
        Left Surround" />
    </Parameter>
  </Track>
```

FIG. 29

```xml
- <Track kind="Audio" name="A6" index="6">
    <Using name="PCM_mono_48_20" />
  - <Parameter name="TrackLabel">
      <SubParameter name="TrackLabel:Symbol" value="RS" />
      <SubParameter name="TrackLabel:Name" value="Full Mix 5.1
        Right Surround" />
    </Parameter>
  </Track>
- <Track kind="Audio" name="A7" index="7">
    <Using name="PCM_mono_48_20" />
  - <Parameter name="TrackLabel">
      <SubParameter name="TrackLabel:Name" value="Full Mix
        Stereo Left" />
    </Parameter>
  </Track>
- <Track kind="Audio" name="A8" index="8">
    <Using name="PCM_mono_48_20" />
  - <Parameter name="TrackLabel">
      <SubParameter name="TrackLabel:Name" value="Full Mix
        Stereo Right" />
    </Parameter>
  </Track>
- <Track kind="Audio" name="A9" index="9">
    <Using name="PCM_mono_48_20" />
  - <Parameter name="TrackLabel">
      <SubParameter name="TrackLabel:Name" value="Mix Minus
        Narration Stereo Left" />
    </Parameter>
  </Track>
- <Track kind="Audio" name="A10" index="10">
    <Using name="PCM_mono_48_20" />
  - <Parameter name="TrackLabel">
      <SubParameter name="TrackLabel:Name" value="Mix Minus
        Narration Stereo Right" />
    </Parameter>
  </Track>
- <Track kind="Audio" name="A11" index="11">
    <Using name="PCM_mono_48_20" />
  - <Parameter name="TrackLabel">
      <SubParameter name="TrackLabel:Name" value="Music and
        Effects Stereo Left" />
    </Parameter>
  </Track>
- <Track kind="Audio" name="A12" index="12">
    <Using name="PCM_mono_48_20" />
  - <Parameter name="TrackLabel">
      <SubParameter name="TrackLabel:Name" value="Music and
        Effects Stereo Right" />
    </Parameter>
  </Track>
- <Track kind="Audio" name="A13" index="13">
    <Using name="PCM_mono_48_20" />
```

FIG. 30

```xml
        - <Parameter name="TrackLabel">
            <SubParameter name="TrackLabel:Name" value="Narration
              Mono" />
          </Parameter>
        </Track>
      - <Track kind="Audio" name="A14" index="14">
          <Using name="PCM_mono_48_20" />
        - <Parameter name="TrackLabel">
            <SubParameter name="TrackLabel:Name" value="Interview and
              foreground dialog Mono" />
          </Parameter>
        </Track>
      - <Track kind="Audio" name="A15" index="15">
          <Using name="PCM_mono_48_20" />
        - <Parameter name="TrackLabel">
            <SubParameter name="TrackLabel:Name" value="Sound
              Effects/SOT/BG dialog Stereo Left" />
          </Parameter>
        </Track>
      - <Track kind="Audio" name="A16" index="16">
          <Using name="PCM_mono_48_20" />
        - <Parameter name="TrackLabel">
            <SubParameter name="TrackLabel:Name" value="Sound
              Effects/SOT/BG dialog Stereo Right" />
          </Parameter>
        </Track>
      </Wrapper>
    </Group>
  </Section>
</Shim>
```

FIG. 31

METHOD AND SYSTEM FOR CREATING MEDIA CONTENT

RELATED APPLICATIONS

This application claims the benefit of U.S. Provisional Application No. 61/731,402 entitled "METHOD AND SYSTEM FOR FILE BASED DELIVERY OF CONTENT" filed on Nov. 29, 2012, the entirety of which is incorporated by reference herein.

BACKGROUND OF THE INVENTION

1. Field of Invention

The present invention relates to a method and system for configuring the creation of video files based on specific criteria. The specific criteria may be standard or provided by the ultimate recipient or user of the video file, such as a media network or distributor.

2. Description of Related Art

The art of media technology today is characterized by a number of incompatible digital file types. Previously, when video tape was used, there were only a few tape formats (e.g., in the range of 10-15 tape formats), and the tapes of a given format were compatible with each other. For example, if a Sony high-definition video digital recording videocassette (HDCAM) deck was used, all Sony HDCAM tapes would work on the HDCAM deck regardless of who created the tape.

Today, there are hundreds of thousands of digital video file variations. As a result, file compatibility is an enormous problem for media technology companies seeking to move away from standard video tape. There is a need, therefore, for a method and system that enables the makers of video files to create such files to a given specification, in order to ensure that all files used by a given user are created to the user's specification and are of the same, or at least of a compatible type.

There is a further need in the art to define physical media (e.g., video or audio inputs), file parameters, and metadata requirements of a multimedia file as a plurality of precise parameters, tags and values necessary to describe the physical media in a format that may be read and used directly by content editing, compounding and bundling systems contemplated on various computing platforms.

SUMMARY OF THE INVENTION

In light of the above-described problems and shortcomings, aspects of the present invention relate to methods and systems that enable the makers of video files to create such files to a given specification, in order to ensure that all files used by a given user are created to the user's specification and are of the same, or at least of a compatible type.

Further, aspects of the present invention are directed to methods and systems for defining physical media (e.g., video or audio inputs), file parameters, and metadata requirements of a multimedia file as a plurality of precise parameters, tags and values necessary to describe the physical media in a format that may be read and used directly by content editing, compounding and bundling systems contemplated on various computing platforms.

Yet further aspects of the present invention are directed to methods, systems and computer program products, relating to configuring a plurality of parameters of a shim file to define a format of at least one media content input, creating a file based program master based on the shim file, and providing the created file based program master to a user for creating and delivering the at least one media content input.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various exemplary aspects of the systems and methods will be described in detail, with reference to the following figures, wherein:

FIG. 1 is a shim file structure in accordance with aspects of the present invention;

FIG. 2 is an example shim file in accordance with aspects of the present invention;

FIG. 3 shows example shim parameters in accordance with aspects of the present invention;

FIGS. 4-5 define Parameters for Wrappers of a shim file in accordance with aspects of the present invention;

FIG. 6 shows example Parameters for Tracks of Timecode kind in accordance with aspects of the present invention;

FIGS. 7 and 8 collectively define sample Parameters for Tracks of Video kind in accordance with aspects of the present invention;

FIGS. 9-11 collectively define Parameters for Tracks of Audio kind in accordance with aspects of the present invention;

FIGS. 20-23 show an XML schema document used to normatively define a structure of a shim file in accordance with aspects of the present invention;

FIGS. 24-26 show a sample shim XML file as a valid instance of the shim schema of FIGS. 20-23 in accordance with aspects of the present invention;

FIGS. 28-31 show another example implementation of a method and system in accordance with aspects of the present invention;

DETAILED DESCRIPTION

Figure 12:
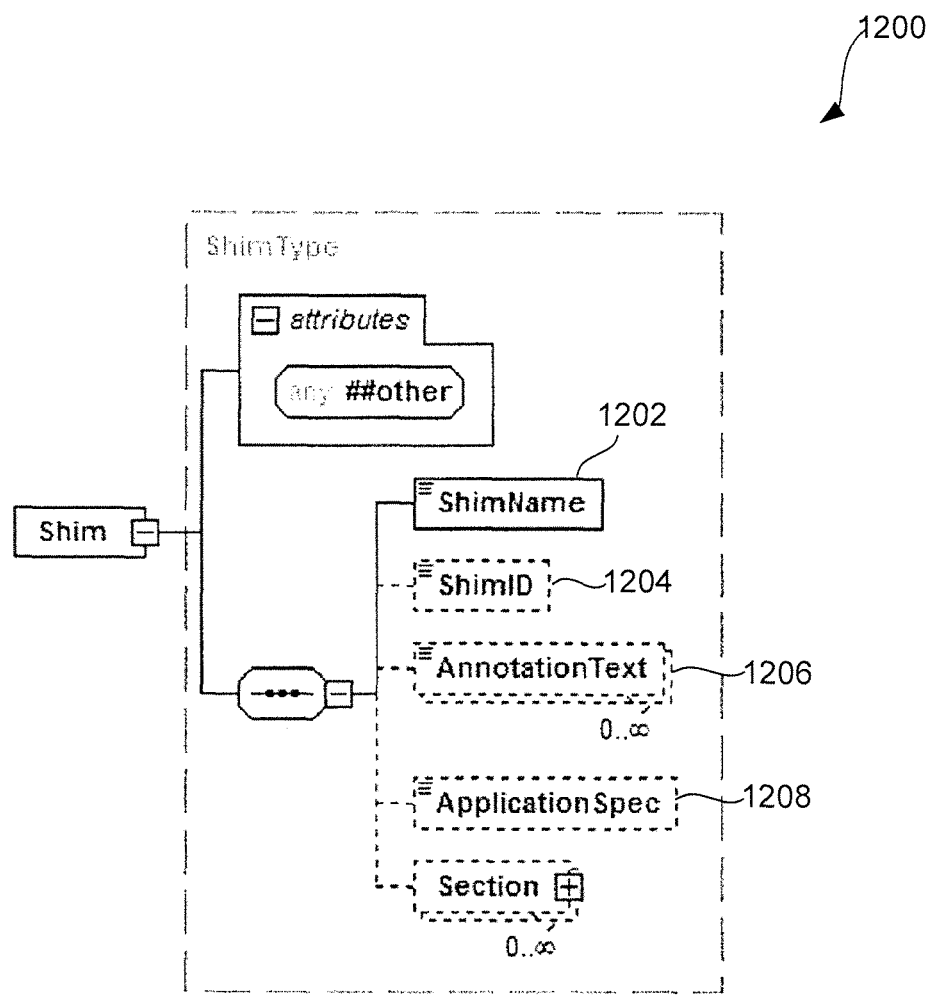
FIG. 12 is a top-level shim file structure in accordance with aspects of the present invention.
Figure 13:
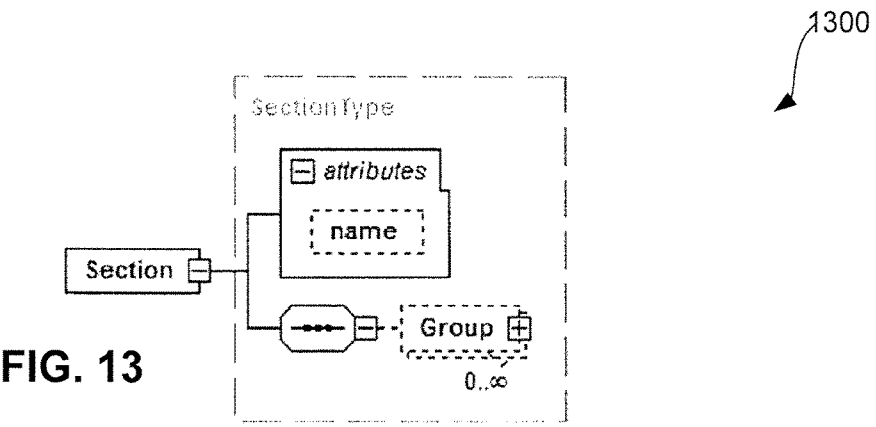
FIGS. 13-19 show a nested hierarchy of Section(s), Group(s), Wrapper(s), Track(s), Parameter(s), SubParameter(s) and Limit(s) within a shim file in accordance with aspects of the present invention.
Figure 14:
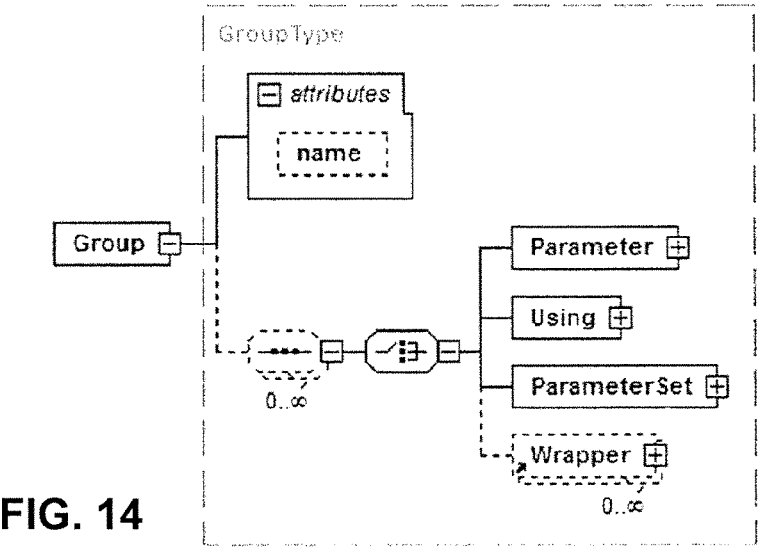
Figure 15:
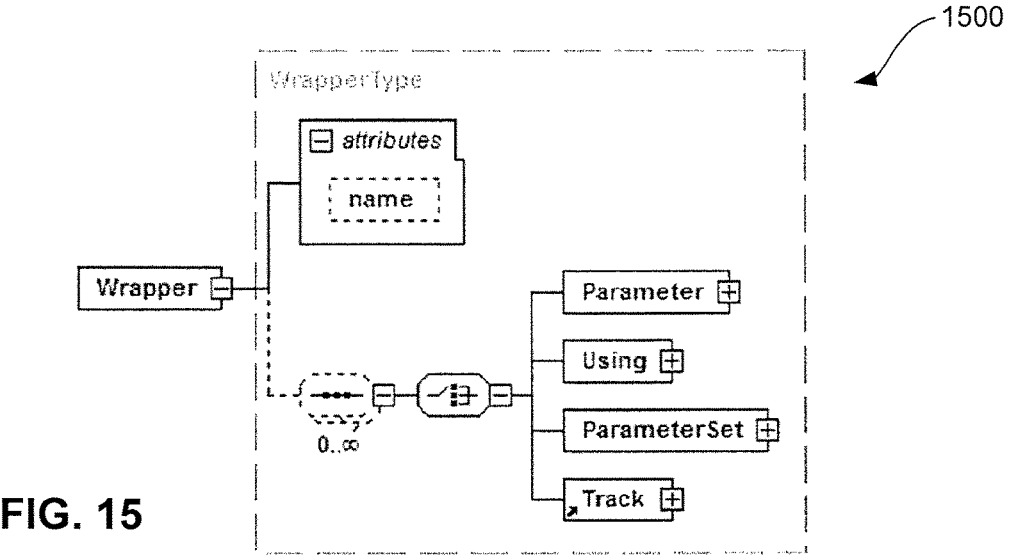
Figures 16, 17:
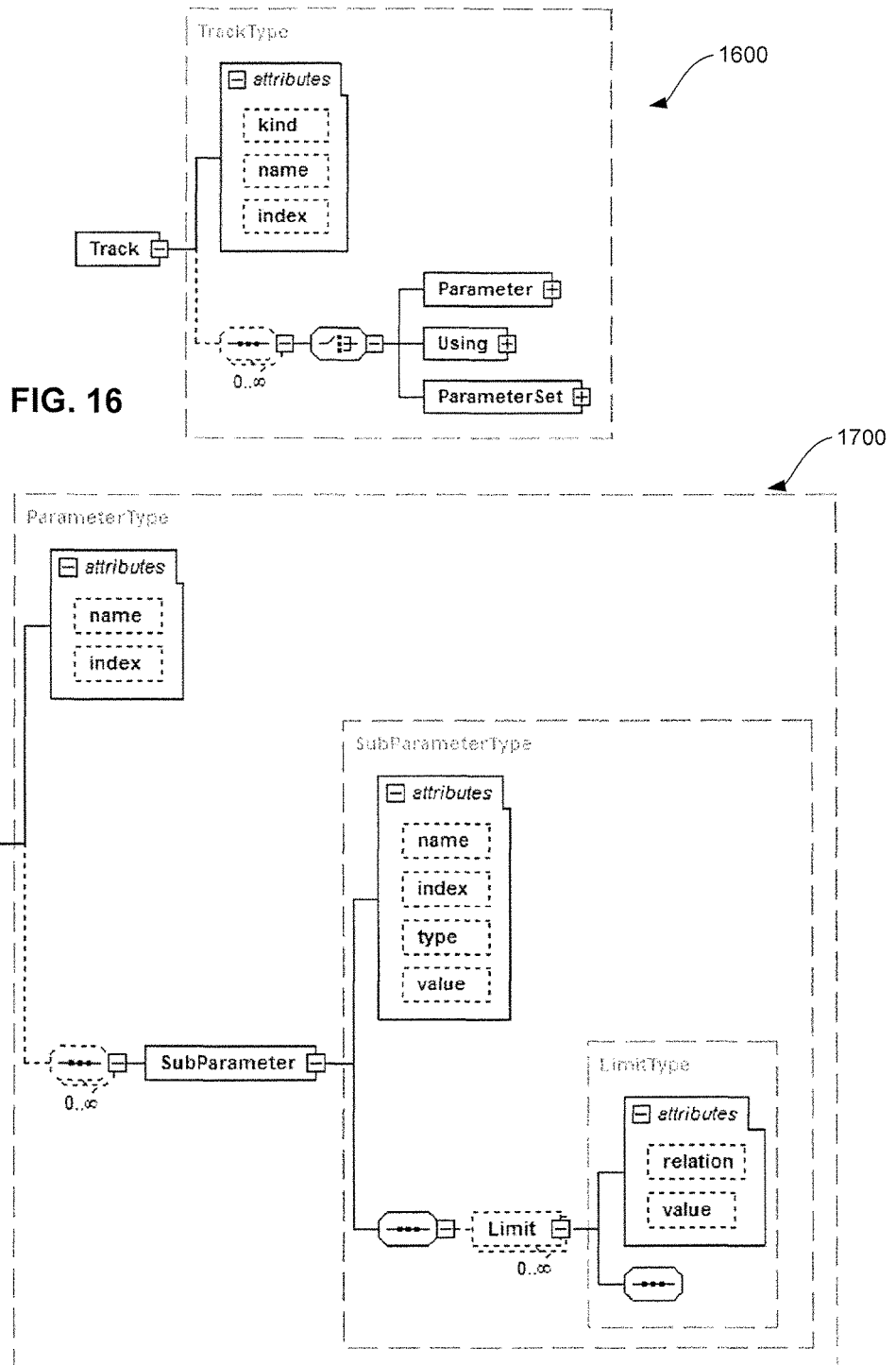
Figure 18:
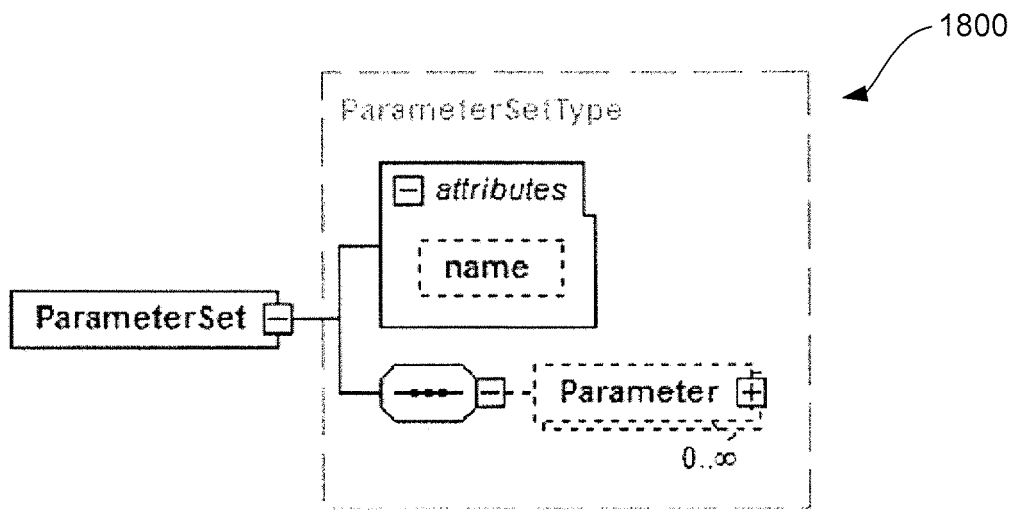
Figure 19:
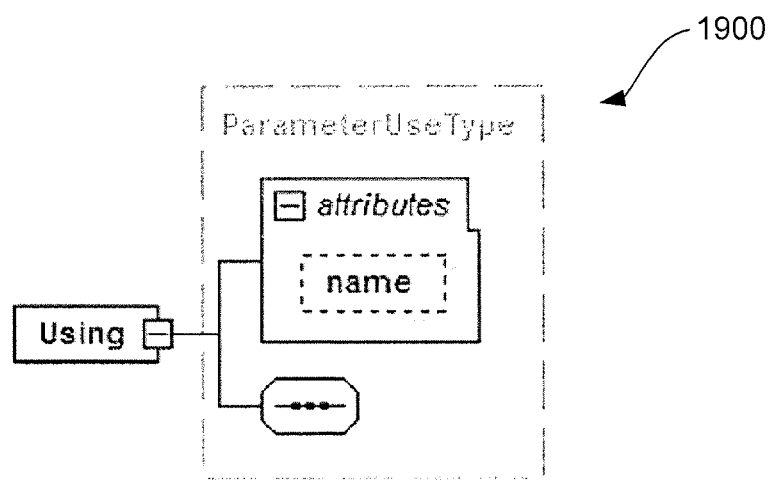

These and other features and advantages of this invention are described in, or are apparent from, the following detailed description of various example aspects.

The present invention, in accordance with an aspect, is directed to determining a plurality of parameters of a shim file to define a format of at least one media content input, creating a file based program master based on the shim file, and providing the created file based program master to a user for creating and delivering the at least one media content input. In accordance with one aspect, the present invention is directed to methods and systems for defining physical media (e.g., video or audio inputs), file parameters, and metadata requirements of a multimedia file as a plurality of precise parameters, tags and values necessary to describe the physical media in a format that may be read and used directly by content editing, compounding and bundling systems contemplated on various computing platforms.

In accordance with an aspect of the present invention, the following terminology may be used to describe various different parts of a file based program master. For example, "Essence" may refer to an actual video or audio content contained within a file. A "Volume" may be a logical drive created on the physical media by a file system. In some instances, volumes may be given names and drive letters. The "Root" of a volume may be the topmost layer of organization, and "Folders" may be following layers of organization within a volume. In addition, a folder may be created within the root of a volume or nested within another folder. Further, a file "Wrapper" may refer to a digital container that holds the video and audio essence along with at least a portion of the file metadata. Wrapper formats are often associated with certain file extensions. The .MOV extension, for example, indicates that the file may use a Quicktime wrapper.

In some aspects, in defining physical media (e.g., video or audio inputs), file parameters, and metadata requirements for file based program masters, one or more shim files may be created to contain a plurality of precise parameters, tags and values that may be necessary to describe the physical media in a format that may be read and used directly by content editing, compounding and bundling systems contemplated on various computing platforms. For example, as a high-level structure requirement and for easy machine-readability, shim files may be constructed as Extensible Markup Language (XML) documents. More specifically, a top-level element in an XML document may include identifiers and useful annotations. Within the top level, the body of a shim file may be presented in the following nested levels:

Section. Each Section may describe a major division of the content, such as Main, Audio, Graphics, Metadata.

Group. Each Group may describe a part of a Section. For example, within Graphics there may be Groups for Open, Credits, Lower Thirds Graphic.

Wrapper. Within a Group there may be one or more Wrapper elements to describe the wrapper in which the essence and metadata Tracks are contained.

Track. Each Track may describe a particular usage of Essence within a Group. For example, within the Audio Section may be a Narration Group with an ENG Track and a SPA Track. Tracks may be single-channel (for example, Picture), or multi-channel (for example, Stereo or Surround).

Parameter. Each Parameter describes a named aspect of a Track (or perhaps a Group or Section) and specifies a required value. For example, an Audio/Narration/ENG Track might have a parameter name "Wrapper," value "BWAV" (a well-known abbreviation for Broadcast Wave File Format).

SubParameter. Within Parameters, SubParameters may be specified. For example, a Codec parameter may require a Version subparameter.

Limits. In cases where a parameter does not have a single precise allowed value, Limits may be given in a nested element (or elements). Limits may specify a range of values, or a set of enumerated values.

ParameterSet. Each ParameterSet describes a collection of Parameters with SubParameters or Limits and their corresponding values that may be applied to a Track (or perhaps a Group or Section) and specifies a required value. For example, a ParameterSet "PCM_48_20" may define parameters for 48 kHz 20 bit pulse-code modulation (PCM) audio that may be used by many Tracks.

Using. This element may indicate a use of a ParameterSet, and may appear wherever a Parameter can be specified. The values of any Parameters of PSubParameters obtained from the ParameterSet may be overridden by specifying additional Parameter elements.

In some aspects, there may be no more than a single possible Group within a Section, or a single possible Track within a Group. For simplicity of implementation and to allow for future growth, as shown in FIG. 1, a structural level 100 may still be present in a shim file but with a blank name attribute. An example of a complete shim file 200 is illustrated in FIG. 2, along with annotations and explanations defining the attributes. It should be appreciated that the details of the example 200 in FIG. 2 are illustrative and may not necessarily correspond to any specific shim file in use by any user. In one aspect, actual shim files for use by content editing systems to deliver tangible program masters may be published separately. In another aspect, the example XML document 200 shown in FIG. 2 may be used to describe a program master containing a single unnamed group. More specifically, the Main Program is in a Wrapper of type MOV, built by the QuickTime MOV writer with no external references (i.e., self-contained, not a QuickTime Reference Movie), and within the Wrapper are Timecode 202, Video 204, and two Audio Tracks 206, 208. A Metadata Section (not shown) may have one Group called Companion, for example, and its wrapper may be an XML file using an external schema referenced by the shim file 200.

Referring to FIG. 3, in a generic shim file, shim parameters may be defined semantically to indicate where they may occur, for example: /Section/Group, and cardinality, associated attributes, and value-ranges.

In some aspects, a shim identifier (shim_id) may be defined to identify a shim file (interchangeably referred to herein as a "shim") and the identifier is intended to signal a version of the shim that is in use when a bundle of associated media files and information are to be created or modified. Annotation text defining the attributes may be provided.

Further, as described above, each Section may describe a major division of the content, such as Main, Audio, Graphics, Metadata. A general form of a Section may be:

<Section name="{name}">
{content}
</Section>

Where {name} is a section name, written in UpperCamelCase, unique throughout the entire shim namespace; and {content} is a sequence of one or more Groups (see below).

Each Group may describe a part of a Section. For example, within Graphics there may be Groups for Open, Credits, Lower Thirds Graphic, for example, and a general form of a Group may be:

<Group name="{name}">
{content}
</Group>

Where {name} is the group name, written in UpperCamelCase, unique throughout the entire shim namespace; and {content} is a sequence of one or more Wrappers (see below).

Each Wrapper may describe a file wrapper which contains a collection of Tracks. For example, within the Program there may be a Wrapper whose type (e.g., described by Paramaters) is a MOV file written by QuickTime. A general form of a Wrapper may be:

```
<Wrapper name="{name}">
{content}
</Wrapper>
```

Where {name} is the Wrapper name, written in UpperCamelCase, unique throughout the entire shim namespace; and {content} is a sequence of one or more Tracks (see below).

Each Track may describe, e.g., a particular usage of Essence within a Group. For example, within the Audio Section may be a Narration Group with an ENG Track and a SPA Track. Tracks may be single-channel (for example, Picture), or multi-channel (for example, Stereo or Surround). A general form of a Track may be:

```
<Track kind="{kind}" name="{name}" index="{index}">
{content}
</Track>
```

Where

{kind} is the Track kind, which may be one of Picture, Sound, Data, Text.

{name} is the Track name, written in UpperCamelCase, unique throughout the entire shim namespace.

{index} is the index of a specific Track when several Tracks are permitted.

{content} is a sequence of one or more Parameters (see below).

This form may permit a description of multiple tracks, for example:

```
<Track kind="Audio" name="AI" index="1">
<Parameter name="Audiocodec">Pcm</Parameter>
<Parameter name="AudioTrackLaber">Left</Parameter>
</Track>
<Track kind="Audio" name="A2" index="2">
<Parameter name="Audiocodec">Pcm</Parameter>
<Parameter name="AudioTrackLabel">Right</Parameter>
</Track>
```

Each Parameter may describe a named aspect of a Track (or perhaps a Group or Section) and may specify a required value. For example, an Audio/Narration/ENG Track may have a parameter name "Wrapper" and a value "BWAV" (an abbreviation for Broadcast Wave File Format). The general form of a Parameter may be:

```
<Parameter name="{name}" index="{index}" type="{type}">{value}</Parameter>
```

Where

{name} is the parameter name, written in UpperCamelCase, unique throughout the entire shim namespace.

{index} is the index of a specific Parameter when several values are needed.

{type} is the type of the value, which may be one of the simpleTypes defined by another XML Schema. The type specifier is usually given unambiguously in the parameter definition, hence this attribute is optional.

{value} is the single value for the Parameter or a set of Limits (see below).

Each SubParameter may describe a named aspect of a Parameter and specify a required value. SubParameters may be provided to help organize the namespaces for Parameter and SubParameter names and avoid issues with non-unique names. The general form of a SubParameter may be:

```
<Subparameter name="{name}" index="{index}" type="{type}">{value}</Subparameter>
```

Where

{name} is the subparameter name, written in UpperCamelCase, unique throughout the entire shim namespace.

{index} is the index of a specific Sub Parameter when several values are needed.

{type} is the type of the value, which may be one of the simpleTypes defined by another XML Schema. The type specifier is usually given unambiguously in the parameter definition, hence this attribute is optional.

{value} is the single value for the SubParameter or a set of Limits (see below).

Limits may be optional, for example. In cases where there is a single allowed value for a Parameter, that value may be provided as simple content of the Parameter element. When a range of values, or one or more of an enumeration of values is required, the value may be specified using one or more <Limit/>elements in place of the simple content.

Each Limit may be expressed as a predicate including a relation and one or more values. For example:

```
<Parameter name="VideoBitRate">
<Limit relation="less_than">300000000</Limit>
</Parameter>
```

Or

```
<Parameter name="VideoCodec">
<Limit relation="one_of">DNxHD ProRes AVCI</Limit>
</Parameter>
```

Or

```
<Parameter name="Language">
<Limit relation="one_of" vocabulary="IS0639-2"/>
</Parameter>
```

It should be understood that other Limits may also be defined.

Each ParameterSet may describe a collection of Parameters, SubParameters or Limits, for example, and their corresponding values that may be applied to a Track (or perhaps a Group or Section) and may specify a required value. For example, a ParameterSet "PCM_48_20" may define parameters for 48 kHz 20 bit PCM audio that can be used by many Tracks. The general form of a ParameterSet may be:

```
<ParameterSet name="{name}">{value}</ParameterSet>
```

Where

{name} is the name of the parameter set, written in UpperCamelCase, unique throughout the entire shim namespace.

{value} is a set of Parameter elements (see above), each of which may contain SubParameters or Limits.

In some aspects, in addition to the foregoing generic shim syntax, the following shim elements may be configured. For example, Sections may comprise Main, SupplementalAudio, Metadata, and Graphics. Groups within a given Section may comprise: Main Groups; Groups within a Supplemental Audio Section; Groups within a Metadata Section; and Groups within a Graphics Section. In one aspect, there may be only a single Group in the main section for a program.

For Wrappers within given Groups, in some aspects, there may be only a single Wrapper in the main Group in a main Section. Additionally, for Tracks within a Main Wrapper and within a Main Group, shims may comprise Timecode, Video and Audio Tracks.

Referring to FIGS. 4-11, shims may be configured to use the Parameters and SubParameters defined therein. For example, FIGS. 4-5 may define Parameters for all Wrappers;FIG. 6 may define Parameters for all Tracks of Timecode kind; FIGS. 7 and 8 may collectively define Parameters for all Tracks of Video kind; and FIGS. 9-11 may collectively define Parameters for all Tracks of Audio kind. In one aspect, parameters that are common to most Tracks may be gathered into a ParameterSet for easy reuse.

With respect to Limits, in some aspects, shims may specify the permitted Version of the Video Codec with a "greater_equal" limit.

Furthermore, ParameterSets may be configured to define Audio ParameterSets. In one aspect, as most, if not all, Audio Tracks use the same Parameters and SubParameters, to avoid unnecessary repetition, a ParameterSet named "PCM_mono_48_20" may gather and define the common Parameters and SubParameters such as AudioCodec:Coding, AudioSampling:Channels, AudioSampling:BitsPerSample, and AudioCoding:SamplingRate.

Referring to FIG. 12, a top-level shim file structure 1200 may be defined to comprise, among other features, a shim name element 1202, shim identifier element 1204, Annotation text element (optional) 1206, and Application specification element (optional) 1208. More specifically, shim name element 1202 may define a name for a specific shim, and the value of the element may be of type xs:string. Shim identifier (ShimID) element 1204 may be defined to contain a string identifier of the shim specification as shown in FIG. 2, and the value of the element may be of type xs:anyURI. Optional Annotation text (AnnotationText) element 1204 may be present for display as guidance to a user and may be configured to comprise a list of zero or more free-form, human-readable annotations describing the shim. An Optional Application specification element (ApplicationSpec) 1206 may be reserved for future use and the value of the element may be of type xs:string.

Referring to FIGS. 13-19, a nested hierarchy of Section(s) 1300, Group(s) 1400, Wrapper(s) 1500, Track(s) 1600, Parameter(s) 1700, SubParameter(s) 1800 and Limit(s) 1900 within an overall shim is shown and the structure of each element may be similar to that of another element. In some aspects, the kind attribute may be required only for Track elements, and may be used to specify which of the enumerated kinds (e.g., Timecode, Video, Audio, and Data) of Tracks is being described. The name attribute may be optional, and may be used to identify the instance of the element informally in documentation or formally in an XPath expression. The index attribute may also be optional, and may be used to identify the instance of the element informally in documentation or formally in an XPath expression. The value attribute carries the value of a simple SubParameter without Limits. The optional type attribute may be used to explicitly state the type of a value. For example, it may be used to draw attention to an enumerated type. The relation attribute may be used to express the relation in a Limit predicate, for example "less" is a relation that asserts that a SubParameter is less than the value attribute. In one aspect, Relations may comprise, but are not limited to: equal, less, less_equal, greater, greater_equal, not_equal, and one_of. Further, in some aspects, the same collection of Parameters and SubParameters may be used repeatedly. To avoid repetition of the settings, the ParametersSet and Using elements shown in FIG. 18 may allow a collection to be stated once and then reused. Additional or replacement Parameters and SubParameters may be given each time a ParameterSet is used, for example.

Referring to FIGS. 20-23, an XML schema document may be used to normatively define the structure of a shim file using any suitable machine-readable language. A sample shim XML file, as shown in FIGS. 24-26, may be a valid instance of the shim schema of FIGS. 20-23.

Figure 27:
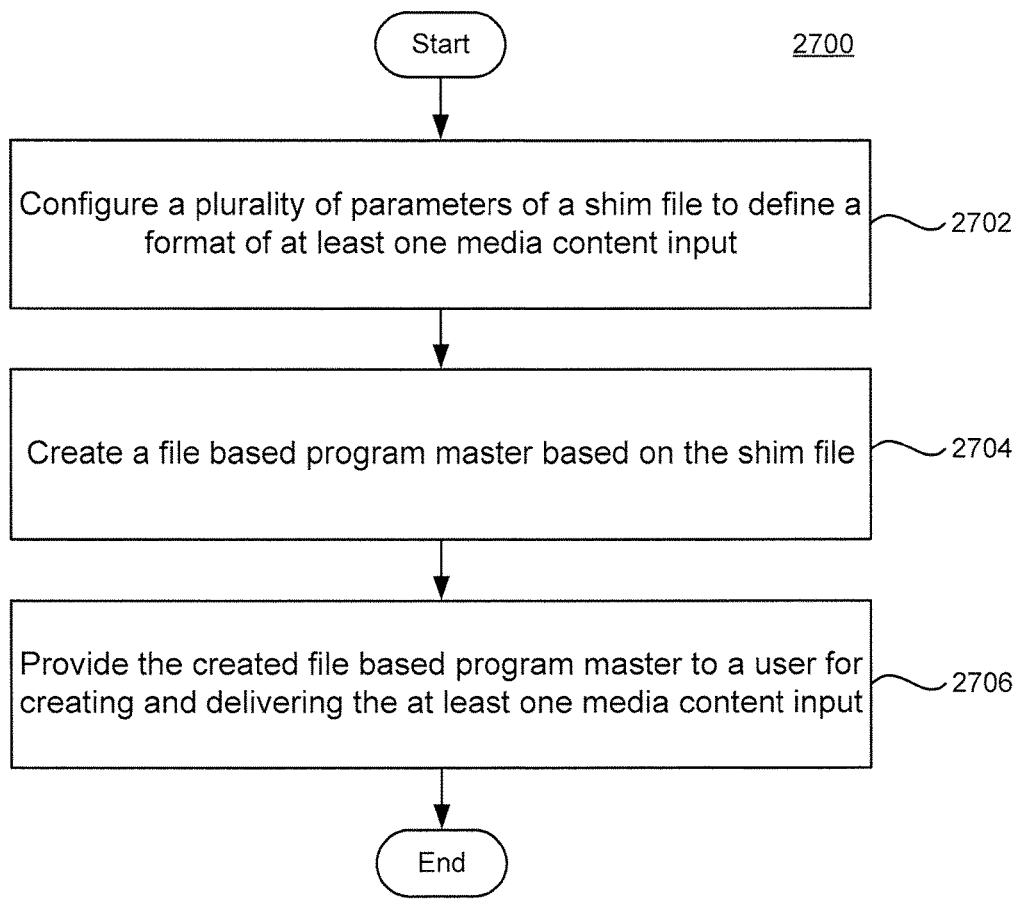
FIG. 27 shows a flow chart illustrating an exemplary method for generating a shim file in accordance with aspects of the present invention.

Referring to FIG. 27, a flow chart illustrating an exemplary method for generating a shim file in accordance with aspects of the present invention is provided. For example, process 2700 may be implemented by employing a processor to execute computer executable instructions stored on a computer readable storage medium to implement a series of steps. In an aspect, a computer device comprising a processor may configure 2702 a plurality of parameters of a shim file to define a format of at least one media content input, create 2704 a file based program master based on the shim file, and provide 2706 the created file based program master to a user for creating and delivering the at least one media content input.

Referring to FIGS. 28-31, another example implementation of the method and system in accordance with aspects of the present invention is illustrated. Those figures show an example shim that may instruct a compliant product to create a file based program master MAIN file that complies with example specifications for File Based Program Delivery.

Figure 32:
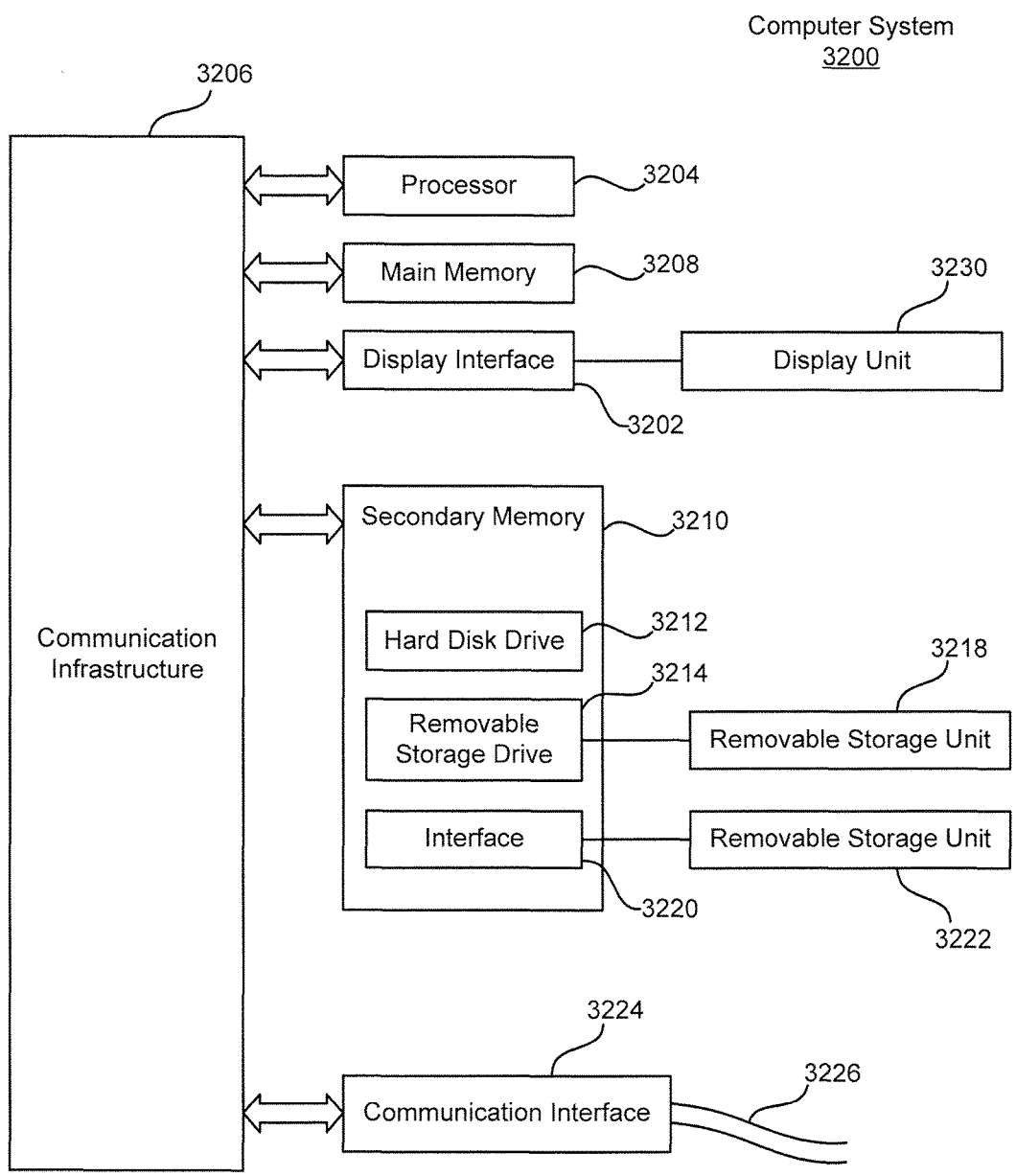
FIG. 32 presents an exemplary system diagram of various hardware components and other features, for use in accordance with an aspect of the present invention.

FIG. 32 presents an exemplary system diagram of various hardware components and other features, for use in accordance with an aspect of the present invention. The present invention may be implemented using hardware, software, or a combination thereof and may be implemented in one or more computer systems or other processing systems. In one aspect, the invention is directed toward one or more computer systems capable of carrying out the functionality described herein. An example of such a computer system 3200 is shown in FIG. 32.

Computer system 3200 includes one or more processors, such as processor 3204. The processor 3204 is connected to a communication infrastructure 3206 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 3200 can include a display interface 3202 that forwards graphics, text, and other data from the communication infrastructure 3206 (or from a frame buffer not shown) for display on a display unit 3230. Computer system 3200 also includes a main memory 3208, preferably random access memory (RAM), and may also include a secondary memory 3210. The secondary memory 3210 may include, for example, a hard disk drive 3212 and/or a removable storage drive 3214, representing a floppy disk drive, a magnetic tape drive, an optical disk drive, etc. The removable storage drive 3214 reads from and/or writes to a removable storage unit 3218 in a well-known manner. Removable storage unit 3218, represents a floppy disk, magnetic tape, optical disk, etc., which is read by and written to removable storage drive 3214. As will be appreciated, the removable storage unit 3218 includes a computer usable storage medium having stored therein computer software and/or data.

In alternative aspects, secondary memory 3210 may include other similar devices for allowing computer programs or other instructions to be loaded into computer system 3200. Such devices may include, for example, a removable storage unit 3222 and an interface 3220. Examples of such may include a program cartridge and cartridge interface (such as that found in video game devices), a removable memory chip (such as an erasable programmable read only memory (EPROM), or programmable read only memory (PROM)) and associated socket, and other removable storage units 3222 and interfaces 3220, which allow software and data to be transferred from the removable storage unit 3222 to computer system 3200.

Computer system 3200 may also include a communications interface 3224. Communications interface 3224 allows software and data to be transferred between computer system 3200 and external devices. Examples of communications interface 3224 may include a modem, a network interface (such as an Ethernet card), a communications port, a Personal Computer Memory Card International Association (PCMCIA) slot and card, etc. Software and data transferred via communications interface 3224 are in the form of signals 3228, which may be electronic, electromagnetic, optical or other signals capable of being received by communications interface 3224. These signals 3228 are provided to communications interface 3224 via a communications path (e.g., channel) 3226. This path 3226 carries signals 3228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 3280, a hard disk installed in hard disk drive 3270, and signals 3228. These computer program products provide software to the computer system 3200. The invention is directed to such computer program products.

Computer programs (also referred to as computer control logic) are stored in main memory 3208 and/or secondary memory 3210. Computer programs may also be received via communications interface 3224. Such computer programs, when executed, enable the computer system 3200 to perform the features of the present invention, as discussed herein. In particular, the computer programs, when executed, enable the processor 3210 to perform the features of the present invention. Accordingly, such computer programs represent controllers of the computer system 3200.

In an aspect where the invention is implemented using software, the software may be stored in a computer program product and loaded into computer system 3200 using removable storage drive 3214, hard drive 3212, or communications interface 3220. The control logic (software), when executed by the processor 3204, causes the processor 3204 to perform the functions of the invention as described herein. In another aspect, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another aspect, the invention is implemented using a combination of both hardware and software.

Figure 33:
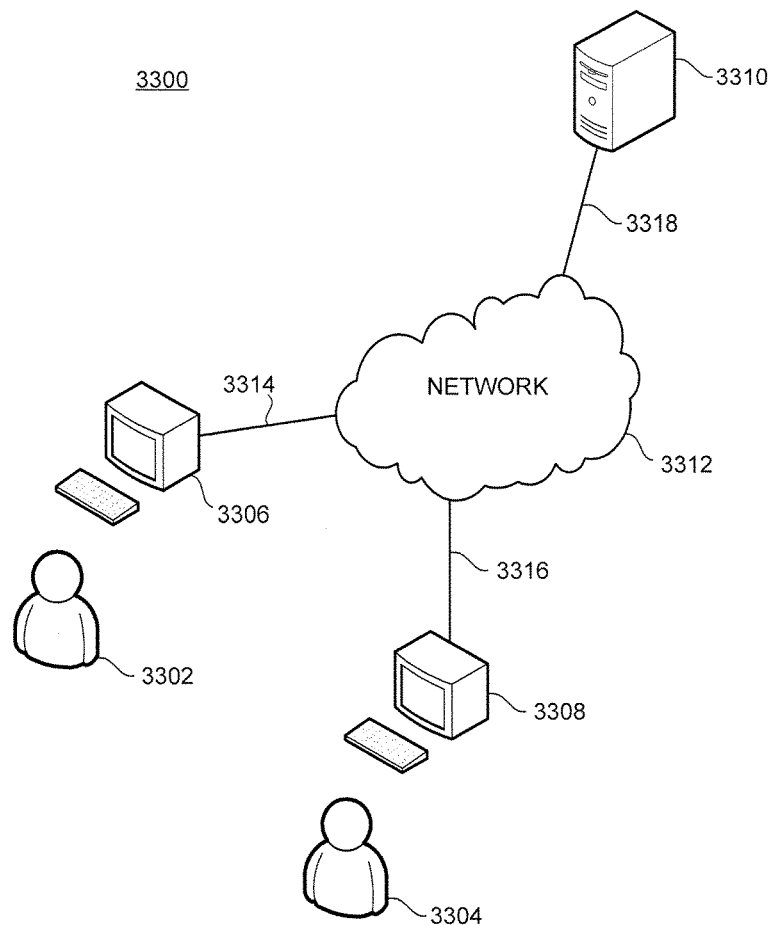
FIG. 33 is a block diagram of various exemplary system components, in accordance with an aspect of the present invention.

FIG. 33 is a block diagram of various exemplary system components, in accordance with an aspect of the present invention. FIG. 33 shows a communication system 3300 usable in accordance with the present invention. The communication system 1000 includes one or more accessors 10330, 10332 (also referred to interchangeably herein as one or more "users") and one or more terminals 1042, 103333. In one aspect, data for use in accordance with the present invention is, for example, input and/or accessed by accessors 10330, 10334 via terminals 1042, 103333, such as personal computers (PCs), minicomputers, mainframe computers, microcomputers, telephonic devices, or wireless devices, such as personal digital assistants ("PDAs") or a hand-held wireless devices coupled to a server 1043, such as a PC, minicomputer, mainframe computer, microcomputer, or other device having a processor and a repository for data and/or connection to a repository for data, via, for example, a network 1044, such as the Internet or an intranet, and couplings 1045, 10433, 10334. The couplings 1045, 10433, 10334 include, for example, wired, wireless, or fiberoptic links. In another aspect, the method and system of the present invention operate in a stand-alone environment, such as on a single terminal.

While this invention has been described in conjunction with the exemplary aspects outlined above, various alternatives, modifications, variations, improvements, and/or substantial equivalents, whether known or that are or may be presently unforeseen, may become apparent to those having at least ordinary skill in the art. Accordingly, the exemplary aspects of the invention, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

What is claimed is:

1. A computer-assisted method, the computer comprising a processor, the method comprising:

receiving an input of at least one segment of media content comprising electronic audio and/or video content;

determining a plurality of elements of a shim file to define a format of the at least one segment of media content, wherein the shim file has a nested hierarchy defining the plurality of elements of the shim file, the elements comprising:

a shim file identifier identifying a version of the shim that is in use when a bundle of associated media files and information are to be created or modified;

a plurality of sections, each section describing a division of the segment of media content, comprising at least a main section, an audio section, a metadata section, and a graphics section;

at least one group nested within at least one section of the plurality of sections, the at least one group describing at least a part of the division of the segment of media content described by the section in which the at least one group is nested;

at least one wrapper element nested within the at least one group, the at least one wrapper element describing a wrapper in which at least a part of the division of the segment of media content described by the section in which the wrapper element is nested is contained;

at least one track nested within the at least one wrapper element, the at least one track describing a usage or type of at least a part of the at least one segment of media content;

at least one parameter nested within the at least one wrapper element, the at least one parameter describing a named aspect of the at least one section, the at least one group, and/or the at least one track;

at least one parameter set nested within at least one of the sections, the groups, and the tracks, the at least one parameter set defining a collection of parameters that are common to a majority of the sections, the groups, and the tracks and their corresponding values applied to at least one of the sections, the groups, and the tracks, and specify one or more required values of the collection of parameters; and at least one using element nested within at least one parameter set, wherein the using element indicates a use of the at least one parameter set;

creating a file based program master based on the elements of the shim file and a specific format defined by a user of the file based program master, wherein the file based program master is separate from the shim file and is designed to include the at least one segment of media content, and wherein the file based program master is compatible with the specific format defined by the user; and providing the created file based program master to the user for creating and delivering the at least one segment of media content, through content editing, compounding, and bundling systems of a computing platform.

2. The method of claim 1, wherein the plurality of elements of the shim file are based on a media type and encoding/decoding attributes of the at least one segment of media content; and wherein only one group is nested within each section and only one track is nested within each group of a nested hierarchy of a shim file.

3. The method of claim 1, further comprising:

determining and collecting similar elements used by a plurality of segments of media content of a same type; and configuring a common elements set for defining a format of a segment of media content of the same type.

4. The method of claim 1, wherein the shim file is constructed as an Extensible Markup Language (XML) document;

wherein the at least one wrapper element is a MOV type element; and wherein the shim file further comprises a metadata section having a companion group with a wrapper element.

5. The method of claim 1, wherein each group defines part of a section as being one or more of an opening, credits, or graphics, and each group has a group name that is unique throughout an entire shim namespace and a content tag defining a sequence of one or more wrappers.

6. The method of claim 1, wherein the elements of the shim file define tags and values necessary to describe the media content in a format readable directly by content editing, compounding and bundling systems of computing platforms.

7. A system, comprising:

at least one processor configured to:
  receive an input of at least one segment of media content comprising electronic audio and/or video content;
  determine a plurality of elements of a shim file to define a format of the at least one segment of media content, wherein the shim file has a nested hierarchy defining the plurality of elements of the shim file, the elements comprising:
    a shim file identifier identifying a version of the shim that is in use when a bundle of associated media files and information are to be created or modified;
    a plurality of sections, each section describing a division of the media content, comprising at least a main section, an audio section, a metadata section, and a graphics section;
    at least one group nested within at least one section of the plurality of sections, the at least one group describing at least a part of the division of the segment of media content described by the section in which the at least one group is nested;
    at least one wrapper element nested within the at least one group, the at least one wrapper element describing a wrapper in which at least a part of the division of the segment of media content described by the section in which the wrapper element is nested is contained;
    at least one track nested within the at least one wrapper element, the at least one track describing a usage or type of at least a part of the at least one segment of media content;
    at least one parameter nested within the at least one wrapper element, the at least one parameter describing a named aspect of the at least one section, the at least one group, and/or the at least one track;
    at least one parameter set nested within at least one of the sections, the groups, and the tracks, the at least one parameter set defining a collection of parameters that are common to a majority of the sections, the groups, and the tracks and their corresponding values applied to at least one of the sections, the groups, and the tracks, and specify one or more required values of the collection of parameters; and
    at least one using element nested within at least one parameter set, wherein the using element indicates a use of the at least one parameter set;
  create a file based program master based on the elements of the shim file and a specific format defined by a user of the file based program master, wherein the file based program master is separate from the shim file and is designed to include the at least one segment of media content, wherein the file based program master is compatible with the specific format defined by the user; and
  provide the created file based program master to the user for creating and delivering the at least one segment of media content, through content editing, compounding, and bundling systems of a computing platform;

a user interface functioning via the processor; and a repository accessible by the processor.

8. The system of claim 7, wherein the plurality of elements of the shim file are based on a media type and encoding/decoding attributes of the at least one segment of media content; and wherein only one group is nested within each section and only one track is nested within each group of a nested hierarchy of a shim file.

9. The system of claim 7, wherein the processor is further configured to:

determine and collect similar elements used by a plurality of segments of media content of a same type; and configure a common elements set for defining a format of a segment of media content of the same type.

10. The system of claim 7, wherein the shim file is constructed as an Extensible Markup Language (XML) document;

wherein the at least one wrapper element is a MOV type element; and wherein the shim file further comprises a metadata section having a companion group with a wrapper element.

11. The system of claim 7, wherein the shim file elements are defined semantically to indicate location, cardinality, associated attributes, and value-ranges.

12. The system of claim 7, wherein each group has a group name that is unique throughout an entire shim namespace and a content tag defining a sequence of one or more wrappers.

13. A computer program product comprising a non-transitory computer readable medium having control logic stored therein for causing a computer to:
receive an input of at least one segment of media content comprising electronic audio and/or video content;
determine a plurality of elements of a shim file to define a format of the at least one segment of media content, wherein the shim file has a nested hierarchy defining the plurality of elements of the shim file, the elements comprising:
a shim file identifier identifying a version of the shim that is in use when a bundle of associated media files and information are to be created or modified;
a plurality of sections, each section describing a division of the segment of media content, comprising at least a main section, an audio section, a metadata section, and a graphics section;
at least one group nested within at least one section of the plurality of sections, the at least one group describing at least a part of the division of the segment of media content described by the section in which the at least one group is nested;
at least one wrapper element nested within the at least one group, the at least one wrapper element describing a wrapper in which at least a part of the division of the segment of media content described by the section in which the wrapper element is nested is contained;
at least one track nested within the at least one wrapper element, the at least one track describing a usage or type of at least a part of the at least one segment of media content;
at least one parameter nested within the at least one wrapper element, the at least one parameter describing a named aspect of the at least one section, the at least one group, and/or the at least one track;
at least one parameter set nested within at least one of the sections, the groups, and the tracks, the at least one parameter set defining a collection of parameters that are common to a majority of at least one of the sections, the groups, and the tracks and their corresponding values applied to at least one of the sections, groups, and tracks, and specify one or more required values of the collection of parameters; and
at least one using element nested within at least one parameter set, wherein the using element indicates a use of the at least one parameter set;
create a file based program master based on the plurality of elements of the shim file and a specific format defined by a user of the file based program master, wherein the file based program master is separate from the shim file and is designed to include the at least one segment of media content, wherein the file based program master is compatible with the specific format defined by the user; and
provide the created file based program master to the user for creating and delivering the at least one segment of media content, through content editing, compounding, and bundling systems of a computing platform.

14. The computer program product of claim 13, wherein the plurality of elements of the shim file is based on a media type and encoding/decoding attributes of the at least one segment of media content; and
wherein only one group is nested within each section and only one track is nested within each group of a nested hierarchy of a shim file.

15. The computer program product of claim 13, wherein the control logic further causes the computer to:
determine and collect similar elements used by a plurality of segments of media content of a same type; and
configure a common elements set for defining a format of a segment of media content of the same type.

16. The computer program product of claim 13, wherein the shim file is constructed as an Extensible Markup Language (XML) document;
wherein the at least one wrapper element is a MOV type element; and
wherein the shim file further comprises a metadata section having a companion group with a wrapper element.

17. The computer program product of claim 13, wherein the at least one track describes at least a part of the at least one segment of media content as being either a single-channel track, multi-channel track, ENG track, or SPA track.

18. The computer program product of claim 13, wherein the shim file is structured such that only a single possible group defines a section, and only a single possible track defines a group.

* * * * *